A. H. KENNEDY.
EDUCATIONAL APPLIANCE.
APPLICATION FILED NOV. 21, 1918.
1,305,724.
Patented June 3, 1919.
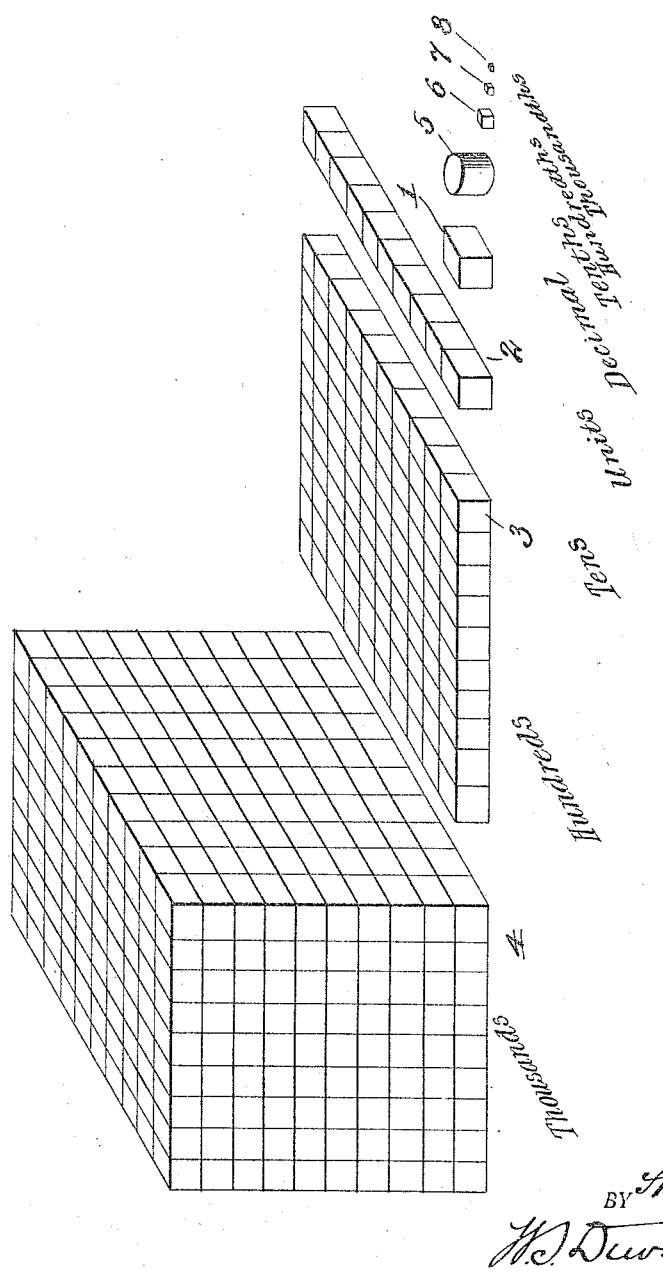
INVENTOR:
BY A. H. Kennedy,
ATTORNEY.

UNITED STATES PATENT OFFICE.

ALBERT H. KENNEDY, OF ROCKPORT, INDIANA.

EDUCATIONAL APPLIANCE.

1,305,724. Specification of Letters Patent. Patented June 3, 1919.

Application filed November 21, 1918. Serial No. 263,479.

*To all whom it may concern:*

Be it known that I, ALBERT H. KENNEDY, a citizen of the United States, residing at Rockport, in the county of Spencer and State of Indiana, have invented a new and useful Educational Appliance, of which the following is a specification.

This invention relates to educational appliances, and more particularly to such as are intended for teaching notation or the relative values of positions of figures.

The principal objects of the invention are to visualize the examples presented to the pupil and thereby impress the same and the theory upon which it is based more vividly upon his mind.

The invention in detail will hereinafter appear and the novel features thereof will be presented in the appended claim.

In the exemplification of the invention, as the same appears in the accompanying drawing, 1 designates a cubical block, preferably one-inch square, which, for convenience, I shall term a unit-block. A series composed of ten of these blocks is employed, and when arranged in a row, as shown in the drawing, their aggregate length is exactly ten-inches. These blocks may be consecutively numbered from one to ten on each of their six faces, or, they may be left blank, as preferred.

A series composed of ten strips, each ten inches long, each being designated as 2, are designated as the tens-blocks. These strips may or may not be numbered on their ends from one to ten, and are capable of being piled one upon another in vertical series, in a manner evident. Their four longitudinal faces are preferably divided into spaces each of which corresponds in size with a unit-block, and such spaces may or may not be numbered from one to ten.

The hundreds-blocks, of which there are ten, may be numbered on their edges from one to ten or left blank, as preferred, and each block is exactly square and divided into rectangular spaces or divisions each of which corresponds to the size of a unit-block. These hundreds-blocks are, in accordance with the proportions suggested, exactly ten inches each way and one inch thick, so that the area of one of such blocks corresponds to that of the ten tens-blocks if the latter were laid side by side. The hundreds-blocks I have designated as 3.

4 designates the thousands-blocks, and such may consist of ten of the hundreds-blocks piled in vertical series, or, as herein shown, it may be composed of ten cubical blocks each ten times as thick as the hundreds-block. Such thousands-blocks may be consecutively numbered, and their surfaces are preferably divided off into degrees or spaces corresponding to the size of the unit-block.

5 designates the decimal, and such, for convenience, may be simply a cylindrical block.

By explaining to the pupil the value of the unit-block, as, for instance, that it represents one dollar, and employing this series of blocks in different numbers, the pupil can be taught visually how a dollar is made up of ten units, and that when ten of such units are combined, they equal a ten, and so on, by using different numbers of the tens-blocks there may be represented to the pupil different amounts up to $199.00. The pupil seeing and understanding by visualization how ten units will equal one ten, may be, by the same theory, taught how ten tens will make one hundred, and after being taught all the different combinations of from one to nine hundred and ninety-nine, can be taught how ten hundreds will make one thousand, and in this manner the theory of notation may be carried forward indefinitely.

The decimals may be taught in a similar manner, by inverse order and ratio, the decimals and integers being divided by the decimal-point 5, the office of which will at once be seen and appreciated.

In teaching the decimals, I utilize in the exemplification cubical blocks, ten in each series, and designated herein as the tenths-blocks 6, the hundredths-blocks 7, and the thousandths-blocks 8, but of course this may be carried out indefinitely. The tenths-block is, of course, but one-tenth the size of the unit-block, the hundredths-block but one-tenth the size of the tenth-block, and the thousandth-block but one-tenth the size of the hundredth-block, and so on in retrogression. Thus by visualization the pupil can appreciate and understand how it actually takes ten of the thousandths-blocks to make a hundredths-block, ten of the hundredths-blocks to make a tenths-block, and ten of the latter to make a unit.

I have not thought it necessary to carry the illustration of the invention further, as it is thought the exemplification is sufficient to illustrate the principle involved, which is simply the employment of blocks arranged in series and made in proportions of ten to one, such proportions being necessary to the invention.

In the exemplification before us, the blocks would indicate and represent to the eye of the pupil the amount of $1111.111. By the use of a series of the blocks up to the thousand-blocks, as high as $10000.00 could be represented, or, of course, any fraction of such amount in dollars, cents, and mills could be represented.

The blocks may be made of any material desired, and they may be covered, if preferred. The divisions, if used, may be made by scoring or impression or otherwise.

It will be understood that any number desired can be produced and visually exemplified for the pupil, the above number merely being illustrated as an example. It will also be understood that the metric or any other system can be visually taught and exemplified merely by the use of appropriate blocks properly proportioned, so that it is not to be understood that my invention is limited in respect to its application.

Having described my invention, what I claim is:

An educational appliance for visually teaching notation, the same comprising a block representing the decimal-point, and at each side thereof a plurality of series of independent geometric blocks of ten each, the blocks of each series being of uniform size and shape, those series of blocks at the left of the decimal-point increasing in dimensions in ratios of ten to one over the series of blocks immediately preceding or the decimal-point, and those blocks of the series at the right of the decimal-point decreasing in dimensions from those of the preceding series and the decimal-point.

In testimony whereof I have signed my name to this specification in the presence of two subscribing witnesses.

A. H. KENNEDY.

Witnesses:
KATE A. NIBLACK,
HENRY L. LANGDON, Sr.

Copies of this patent may be obtained for five cents each, by addressing the "Commissioner of Patents, Washington, D. C."